United States Patent [19]

Fine

[11] Patent Number: 4,491,879
[45] Date of Patent: Jan. 1, 1985

[54] METHOD OF POST PRODUCTION SOUND RECORDING FOR VIDEO TAPED PROGRAMS

[76] Inventor: Clarence R. Fine, 570 North St., Harrison, N.Y. 10528

[21] Appl. No.: 391,384

[22] Filed: Jun. 23, 1982

Related U.S. Application Data

[63] Continuation of Ser. No. 33,950, Apr. 27, 1979, abandoned.

[51] Int. Cl.³ .............................................. H04N 5/782
[52] U.S. Cl. ....................................... 360/14.1; 360/13
[58] Field of Search .............................. 360/14.1–14.3, 360/13; 369/83

[56] References Cited

U.S. PATENT DOCUMENTS

| | | | |
|---|---|---|---|
| 3,020,356 | 2/1962 | Barry | 360/84 |
| 3,026,369 | 3/1962 | Lohmann et al. | 360/14 |
| 3,230,307 | 1/1966 | Bounsull | 360/14 |
| 4,214,278 | 7/1980 | Hunt | 360/14.1 |

OTHER PUBLICATIONS

Estes, Journal of the SMPTE, vol. 84, No. 12, pp. 969–972, 12/75.
Bunting, Journal of the SMPTE, vol. 86, pp. 482–486, 7/77.
Eden-Eadon, Journal of the SMPTE, vol. 87, pp. 504–507, 8/78.

Primary Examiner—Raymond F. Cardillo, Jr.
Attorney, Agent, or Firm—Darby & Darby

[57] ABSTRACT

A method of synchronizing audio and video information is disclosed wherein standard motion picture techniques may be used to form a master finished audio track accurately synchronized with a recorded video signal. A standard master edited video tape is recorded with a conventional SMPTE time code or other code identifying each of the recorded frames. The video signal and time code are transferred to a first sprocketed magnetic film which operates at standard motion picture speeds. This film serves as a "work" print which is then used to build a plurality of audio tracks on sprocket driven films which are synchronized with the video information appearing on the work print. Thereafter, the audio tracks are mixed in synchronism to form a master finished audio track on a second sprocketed magnetic film. The SMPTE time code is transferred from the work print to the second sprocketed magnetic film in synchronism with the master finished audio track. The master audio finished track is then transferred in synchronism to the master edited video tape with the stored SMPTE time codes being used to drive the audio film and video tape in synchronism.

14 Claims, 3 Drawing Figures

METHOD OF POST PRODUCTION SOUND RECORDING FOR VIDEO TAPED PROGRAMS

This is a continuation of U.S. patent application Ser. No. 33,905, filed Apr. 27, 1979 and entitled A METHOD OF POST PRODUCTION SOUND RECORDING FOR VIDEO TAPE PROGRAM in the name of Clarence Robert Fine now abandoned.

This invention relates to a method of synchronizing audio and video information. More specifically, the present invention relates to a process for producing a video tape of the type used in television broadcasting wherein motion picture techniques for synchronizing sound and video may be employed without sacrificing the advantages of modern video editing procedures.

BACKGROUND OF THE INVENTION

In the early days of television, most programs were live or optically recorded (kinescoped) on conventional motion picture film. In such cases, no editing was required. In some cases, a program was recorded on motion picture film and conventional motion picture techniques for editing and synchronizing the sound and visual tracks could be used.

Technological advances in the art of recording video information have increased the desirability of recording television programs on video tape directly. This requires that the video be edited to provide the desired visual effect and also that a sound track be prepared in which the sound effects and dialogue are exactly synchronized with the recorded video.

In recording on video tape, it is common practice to record a time code identifying each recorded frame on the tape medium. The standard time code used in the United States (and other countries which have 30 frame NTSC television is referred to as the SMPTE time code which comprises an 80-bit code of which 43 bits are used to identify the recording time (in hours, minutes and seconds) for each frame and the number of the frame on the tape. In countries where 25 frames per second is standard, the code is referred to as the EBU time code. The use of this SMPTE time code has enabled sophisticated computer controlled techniques for editing video signals and, currently, the editing of video tape is more efficient than the editing of motion picture film wherein various film effects must be spliced together to provide a finished product.

Despite the sophistication of currently available video editing techniques, there is a problem in synchronizing an audio track with the recorded video. As an example, in producing a video tape, it may be necessary to synchronize music tracks, dialogue tracks and tracks containing various types of sound effects. Each one of these tracks (sometimes referred to as a sound mixing element) must be prepared using a time lock system dependent on the recorded SMPTE time code so that the audio and video signals are synchronized exactly. In practice, this is a very expensive undertaking since costly computer equipment must be used to synchronize and prepare the mixing elements on a multi-track tape. Because of the expense involved in revising a recorded element or track, as a practical matter, artistic compromises frequently arise in cases where a director is partially dissatisfied with one or more of the mixing elements. Moreover, the inability of the director or editor to "feel" the visual medium with which he is working as the sound track is created diminishes the feeling of an artistic or creative contribution. All of these factors have limited the acceptance by industry of direct video recording of television programs.

OBJECTS OF THE INVENTION

The principal object of the invention is to provide a simplified and inexpensive method of synchronizing audio and recorded video signals.

A more specific object of the invention is to enable the use of conventional film synchronizing techniques for post production sound mixing of video tapes.

BRIEF SUMMARY OF THE INVENTION

Briefly, in accordance with the invention, a master edited video tape is prepared containing a video signal and a recorded time code identifying each frame. The video signal is then transferred to a first sprocketed magnetic film which may operate at a standard motion picture speed. Using this film as a work print, a plurality of audio tracks are produced in synchronism with the video information recorded on the work print. Thereafter, the recorded audio tracks are mixed to form a master finished audio track which is recorded on a second sprocketed magnetic film together with the time code of the original master edited video tape.

The audio and video signals may then be combined by using the recorded time codes on the finished audio film and the master edited video tape to drive them in synchronism as the audio is transferred to the video tape.

THE DRAWINGS

DETAILED DESCRIPTION

The process according to the invention contemplates the use of conventional video editing techniques in conjunction with motion picture sound synchronizing techniques. Although there is no known commercially available apparatus for performing the process of the invention, the modifications of existing devices required to practice the invention will be apparent to those of ordinary skill in the art in the light of the following description. Accordingly, this specification does not include a detailed description of the physical construction of the various devices and machines used to practice the invention.

Figure 1:
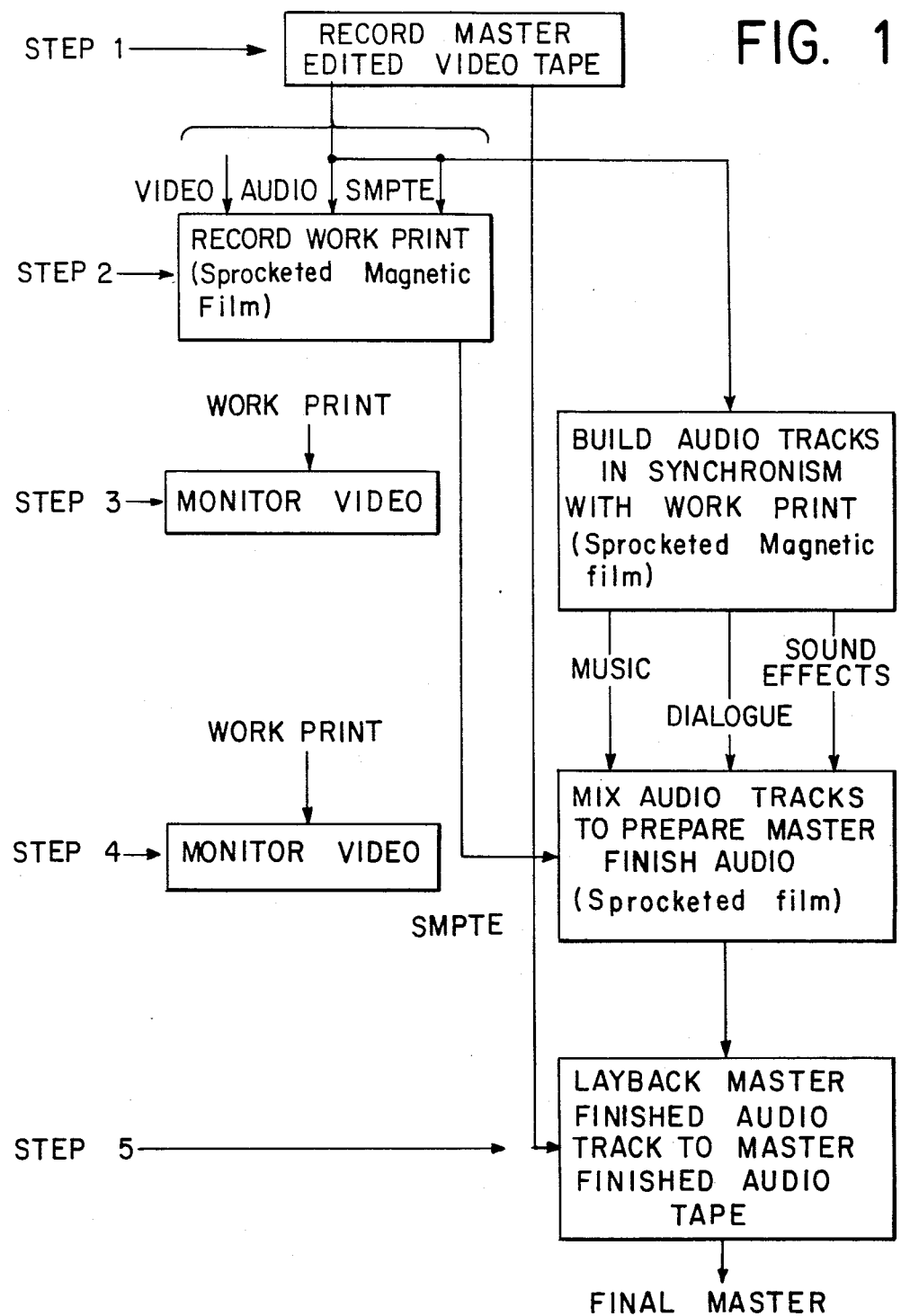
FIG. 1 is a flow chart showing the steps involved in practicing the invention.

The following description may be read in conjunction with the flow diagram of FIG. 1 in which the various steps of the invention are recounted sequentially from top to bottom.

In practicing the invention, it is necessary to first produce (or have produced) a master edited video tape. Conventionally, this may be accomplished by the use of a number of cameras recording a given scene from different angles. At the same time, an audio track containing the dialogue of the scene involved is recorded in conventional fashion on the tape. The director then edits the recorded video, most advantageously by computerized editing equipment, to produce a master edited video tape. Typically, the video is recorded by quadraplex scanning techniques on two-inch magnetic tape or by helical scanning techniques on one inch magnetic tape about 0.5 mils thick.

It is frequently the case that the audio as recorded is unacceptable because of background noise or improper microphone placement. Similarly, in many cases the audio track is incomplete because it contains no music or special sound effects. Accordingly, as a part of the editing process, it is necessary to build a finished audio track which contains the necessary dialogue, music and sound effects. Obviously, the audio track, including all of the separate parts which make up that track, must be accurately synchronized with the video.

In accordance with the invention, the contents of the master edited video tape (video, SMPTE time code, and audio) are transferred to and recorded on a sprocket driven magnetic film which thereafter serves as a work print. The magnetic film has the dimensions of conventional magnetic film and is driven at the corresponding conventional speed. For example, in the case of 16 mm film, the film will be driven at a speed of 36 feet per minute (24 sprockets or frames per second). In the case of 35 mm film also, the film moves at 24 frames per second which corresponds to 96 sprockets per second which corresponds to 96 sprockets per second and a linear speed of 90 feet per minute. Obviously, the selection of film speed does not constitute a feature of the invention but the foregoing are preferred for purposes of convenience. In the case of a 16 mm film, the video signals are recorded on a portion of the film which is one-half inch wide. The audio track can be recorded just inside the sprocket holes or on the sprocketed edge and the conventional SMPTE time code will be recorded outside of the sprocket holes. The control track containing the vertical sync pulses which synchronizes the speed of the scanning mechanism can be recorded on the edge of the film opposite the sprocket holes or just inside the sprocket holes.

Conventionally, a separate tape or film of the audio from the master edited video tape is made at the same time so that a high quality dialogue track will be available for subsequent mixing and/or synchronizing.

Standard magnetic tape for video recording purposes is about 0.5 mils thick. This tape cannot conveniently be handled manually because it is so thin. Accordingly, in the preferred embodiment of the invention, the thickness of the magnetic films is in the order of 3 mils which enables the film to be conveniently handled. In one embodiment of the invention, the 3 mil sprocketed magnetic film was a 16 mm film, driven at a speed of 36 feet per minute. The video recorder/reproducer was a Panasonic helical scan device modified by replacement of the drive mechanism with a standard sprocket wheel movement. The helical scanning unit functions exactly as it did prior to such modification to record thirty video frames per second. These thirty frames are recorded in a linear distance of 7.2 inches (i.e. twenty-four sprocket holes or frames).

The work print created as described above is next used to "build" the audio tracks containing the dialogue, sound effects, and music. Typically, there may be from one to four dialogue tracks, one to four music tracks and from one to ten sound effect tracks. Each track is recorded on a separate film and, ideally, the tracks are maintained separate until the final mixing since this, as is well-known, increases the flexibility of the overall system.

The same apparatus used to record the work print can be used to play back the work print to build the audio tracks although it is anticipated that in practice a second recorder/reproducer will be used for this purpose since the audio tracks will usually be formed in a separate editing area on a flatbed editing machine synchronized to the work print. In any event, a video screen will be provided so that any selected portion of the work print can be replayed enabling reproduction of moving or still images. The ability to replay any selected video frame is a common feature on many commercially available video tape reproducers.

The sprocketed video film will include the SMPTE time code indicating the first frame of the program material. In use, the editor will mark this first frame on the work print so that he has a visibly recognizable starting point on the magnetic film. The audio tracks will then be built in the same fashion as such tracks are built in the production of a motion picture film. This is done by maintaining a fixed physical relationship between each of the audio tracks (films) containing the diverse audio effects. There are various available editing machines for this purpose. For example, pulse controlled motors may drive sprocket wheels which engage the sprockets of the individual tracks, with optical encoding disks fixed to the output shafts of the motors generate the pulses used to maintain fixed relationships between each of the tracks and, of course, the video track. In accordance with the invention, this fixed relationship to the video information can be maintained even though it is in the form of a magnetically recorded signal because the signal is recorded on a sprocketed magnetic film at the same linear speed at which sound editing takes place (e.g. conventional motion picture film speed).

The sound editor runs the film and splices any desired sound effect, dialogue or musical effect onto any one or more of the sprocketed tracks which have been running in synchronism with the video film from the starting point. During sound editing, the editor need not consider television frame measurement and need only concern himself with film footage as is conventionally done in editing motion picture films. This is highly advantageous because of the editor's familiarity with the practice, its relative simplicity, and also because of the direct "hands on" control which is generally preferred from a creative point of view.

A full description of the sound editor's function in building the separate audio tracks is not contained herein since, in accordance with the preferred embodiment, the operation is essentially the same as that which takes place during motion picture film sound editing.

The mixing or final combining of the audio tracks takes place in a mixing room. In this operation, each of a plurality of sprocket-driven audio playback machines (each containing one or more audio tracks) is locked to the others by an optical encoder or any other suitable synchronizing means (e.g. selsyn controlled motor or crystal controlled interlock). The sprocketed video recorder is likewise locked to the audio playback machines, as is a sprocketed audio film recorder on which the mixed sound track is to be recorded. The recorded video from the work print is displayed on a monitor screen during mixing.

In conventional fashion, the mixing engineer combines all of the individual audio tracks (with appropriate volume control, fades, etc.) into a master finished audio track on the audio film recorder. Since all of these tracks are driven in synchronism from the same starting point, the master finished audio track will have the desired relationship to the video with appropriate sound effects as selected by the mixing engineer. During the mixing operation, the SMPTE time code is transferred from the work print to a separate track on the sprocketed film which contains the master finished audio track. Thus, the sprocketed film contains both the master finished audio track and a SMPTE time code which represents to video frames corresponding to the audio track.

The final step is to "lay back" the master finished audio track to the master edited video tape. For this purpose, the master audio finished film is threaded onto a sprocketed reproducer having outputs which generate an audio output signal together with a regenerated SMPTE time code. The audio film is then brought to the starting point on the film (which has been visibly marked on the film). It is now possible to transfer the master finished audio track to the non-sprocketed video tape if the tape and film are locked together so that the audio track remains in exact synchronism with the video. In accordance with the invention, such synchronism is maintained by a comparison of the SMPTE time codes appearing on both the tape and film.

Figure 2:
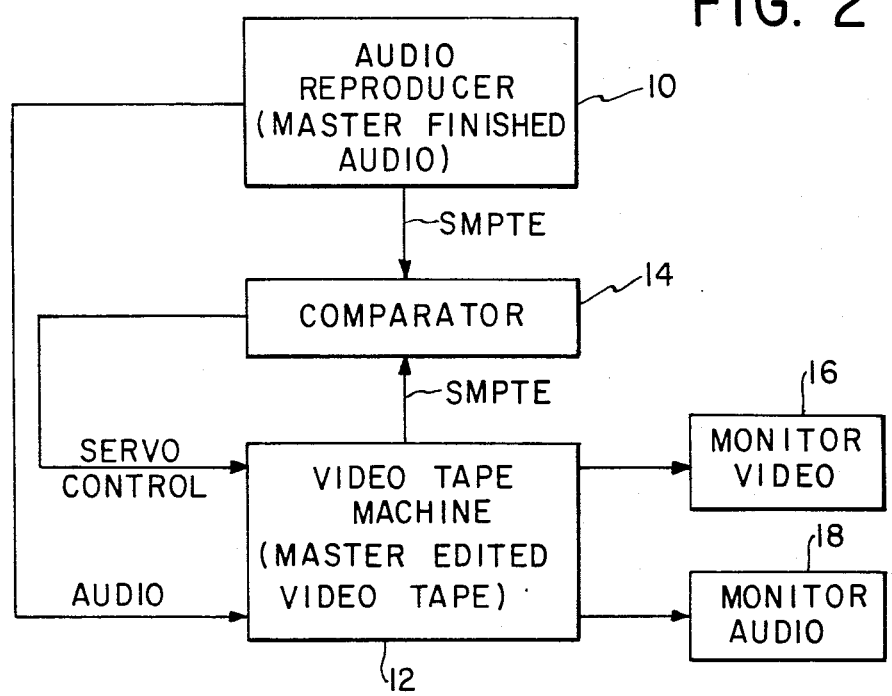
FIG. 2 is a block diagram showing the means for synchronizing the master edited video tape and the master finished audio film.

FIG. 2 shows diagrammatically how the master finished audio track is synchronized with the master edited video tape. The master finished audio, recorded on sprocketed film, is placed on a conventional audio reproducer 10 and the master edited video tape is placed on a video tape machine 12. The SMPTE time codes from both the master finished audio track and the master edited video tape are regenerated and fed to a comparator 14, which generates a servo control error signal when the SMPTE time codes are not the same. This error signal is then used to control the speed of the video tape so that the film and tape are driven in exact synchronism. The error signed could also be used to control the speed of the master finished audio track. The master finished audio track may then be recorded on the master edited video tape in place of the existing audio track. Since the audio has been synchronized with the SMPTE time code, it will then be exactly synchronized with the recorded video. There is no need to compensate for differences in speed between the audio film and the video tape because the SMPTE time code is employed as the synchronizing means.

A video screen 16 and a loud speaker 18 may be used to monitor the video and audio tracks, respectively, during the final combining step.

Although the use of the sprocketed work print is a principal feature of the invention, the invention is not limited to standard motion picture size film or even to standard motion picture speeds although these, of course, are highly preferred because of the adaptability to current machines.

Figure 3:
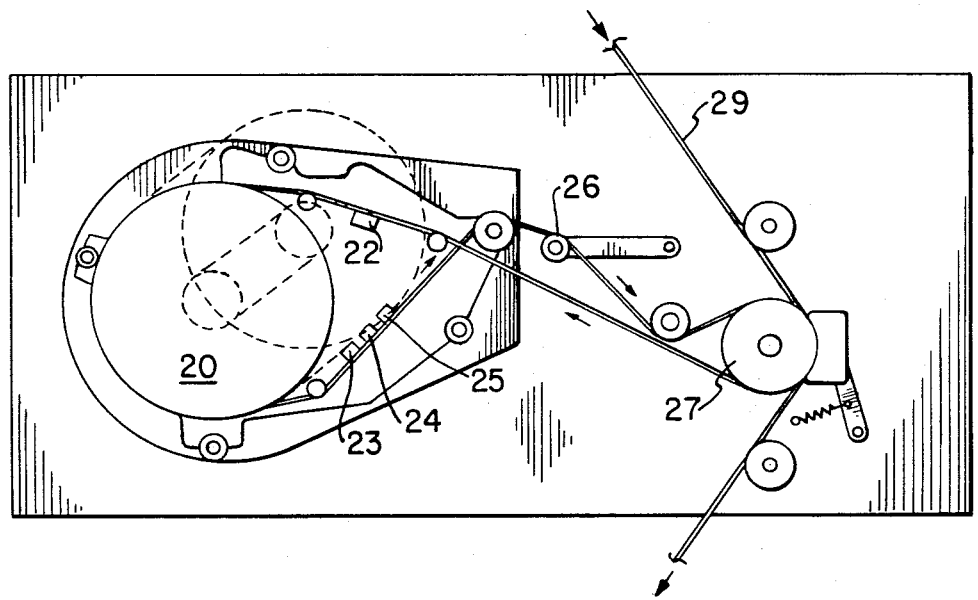
FIG. 3 is a diagrammatic illustration showing the layout of a video tape machine modified to record on and reproduce from a sprocketed magnetic film.

FIG. 3 shows in partially schematic form, the physical layout of the various parts of a video film recorder which was used to record a video work print on sprocketed magnetic film.

A helical video scanning head 20 is mounted conventionally with its axis at an angle so that the tape (or film) is scanned helically. The machine includes a video erase head 22, an audio erase head 23, and an audio record/-playback head 24. In the modification of the apparatus used in practicing the invention, a SMPTE code read/-write head 25 is provided to read or write the SMPTE time code between the sprocket holes and the edge of the film.

The driving mechanism comprises a standard film drive sprocket 27 cooperating with a sprocket shoe 28. The sprocket drive mechanism is shown diagrammatically since it may be (and preferably is) a standard mechanism of the type used to drive movie film.

The magnetic film is shown at 29 with arrows indicating the direction of movement. Thus, the film is wrapped around the top of sprocket 27 passing the video erase head 22 and around the helical scanning head 20 (from top to bottom) where it passes the heads 23, 24 and 25, then over a pressure idler 26 and back around the sprocket 27 to a take-up spool. The idler 26 is moved by a rotary solenoid (not shown) to exert pressure against film 29 in the PLAY mode, whether in forward or reverse directions. This controls the tension applied by the film to the scanning drum. For high speed operation, the idler is moved to release the tension.

What is claimed is:

1. A method for synchronizing audio tracks recorded on sprocket-driven audio films and video signals recorded on a master edited video tape having a recorded time code identifying each recorded frame thereof, said method comprising the steps of:
   transferring at least the video signals and the time code from the master edited video tape to a sprocket-driven magnetic work film, while transporting the film at a predetermined speed;
   recording said recorded time code on a control track on said sprocket-driven work film;
   playing back said audio tracks on a plurality of sprocket-driven units transporting the films at said predetermined speed by maintaining the sprocket drives of said audio films and said work film in mutual synchronization, this synchronization being performed without making use of said recorded time code;
   recording said audio tracks to form a master finished audio track on a sprocket-driven finished audio film transported at said predetermined speed, while maintaining the sprocket drives of all of said sprocket-driven audio films and said work film in mutual synchronization, the mutual synchronization being attached without making use of said recorded time code; and
   transferring said time code from the sprocket-driven magnetic work film to the sprocket-driven finished audio film, while maintaining the sprocket drives thereof in mutual synchronization, the synchronization being attained without making use of said recorded time code, whereby the audio tracks are placed in synchronism with said recorded time code.

2. A method of synchronizing audio and video signals according to claim 1, including the step of laying back the master finished audio track onto the master edited video tape by comparing the recorded time codes and synchronizing the movement of said finished audio film and said master edited video tape as a function of the comparison.

3. A method for synchronizing audio and video signals according to claims 2 or 1, wherein said predetermined speed is a standard motion picture speed.

4. A method of synchronizing audio and video signals according to claim 1 wherein said plurality of audio tracks are recorded on said sprocket-driven audio films while the video information recorded on said sprocket-driven magnetic work film is displayed.

5. A method of synchronizing audio and video signals according to claim 1, wherein said sprocketed magnetic work film is approximately 3 mils thick.

6. A method for synchronizing audio signals recorded on sprocket-driven audio films and video signals recorded on a video tape, comprising the steps of:
 transferring the video signals from the video tape to a sprocket-driven magnetic work film moving at a predetermined linear speed;
 transporting said audio films at said predetermined linear speed while maintaining the sprocket drive thereof and the sprocket drive of said magnetic work film in mutual synchronization, this step being performed without making use of any time code signal recorded on said video tape; and
 synchronously recording on a single medium at least the video signals and the audio signals from said synchronized films.

7. The method of claim 6 performed with a video tape having a recorded time code identifying each recorded frame thereof, said transferring step including the step of transferring said time code from said video tape to said sprocketed magnetic film, said step of recording on a single medium including the steps of recording the signals from said synchronized audio films to form a master finished audio track on a finished sprocketed audio film, and further recording thereon the time code from said sprocketed magnetic work film.

8. The method in accordance with claims 6 or 7, further including the step of monitoring the video signal recorded on said sprocketed magnetic work film while said audio tracks are being synchronized and during said step of recording on a single medium.

9. A method of synchronizing audio and video signals according to claim 1 or 6 wherein said sprocketed magnetic work film is transported at a linear speed corresponding to twenty-four motion picture frames per second.

10. A method for synchronizing at least one audio signal with video signals recorded on a video tape, comprising the steps of:
 transferring at least the video signals from said video tape to a sprocket-driven magnetic work film being transported at a predetermined speed;
 transporting a sprocket-driven audio film at said predetermined speed while maintaining the sprocket drives of said magnetic work film and said audio film in mutual synchronization, this synchronization being maintained without making use of any time code signal recorded on said video tape, and recording said at least one audio signal on said sprocketed audio film, the audio signal being thereby recorded in synchronism with the video signals on said sprocket-driven magnetic work film.

11. A method for synchronizing audio and video signals according to claim 10, including the additional step of recording on a single medium at least the video from said video tape and said audio track in synchronism.

12. A method for synchronizing audio and video signals according to claim 11, including recording a time code identifying each recorded frame of video information on said sprocket-driven magnetic work film, and further including the step of adding to the audio track on said sprocket-driven audio film a regenerated time code from said sprocket-driven magnetic work film.

13. A method of synchronizing audio and video signals according to claim 12, wherein the time codes recorded on said video tape and said sprocketed audio film are used to drive said video tape and audio film in synchronization during said step of recording on a single medium.

14. A method of post production sound recording for television, comprising transversely recording a video signal on a sprocket-driven magnetic work film moving at a predetermined linear speed, recording on said sprocket-driven magnetic work film a control track for synchronizing the transverse scan of the film with the linear speed thereof, synchronizing the movement of at least one sprocket-driven audio film and said work film by maintaining the sprocket drives in mutual synchronization without making use of any time code signal associated with said video signal, and recording on said audio film at least one audio track synchronized with said video signal.

* * * * *